(12) United States Patent
Corl, Jr. et al.

(10) Patent No.: US 7,403,999 B2
(45) Date of Patent: Jul. 22, 2008

(54) CLASSIFICATION SUPPORT SYSTEM AND METHOD FOR FRAGMENTED IP PACKETS

(75) Inventors: Everett Arthur Corl, Jr., Raleigh, NC (US); Brahmanand Kumar Gorti, Cary, NC (US); Colin Beaton Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 10/034,470

(22) Filed: Dec. 28, 2001

(65) Prior Publication Data

US 2003/0126272 A1 Jul. 3, 2003

(51) Int. Cl.
- G06F 15/16 (2006.01)
- G06F 7/00 (2006.01)
- H04L 12/50 (2006.01)

(52) U.S. Cl. ............... 709/230; 233/236; 233/238; 707/102; 370/230; 370/389; 370/392; 370/395.4; 370/395.5; 370/469

(58) Field of Classification Search .......... 709/224, 709/230, 238, 392, 233, 236; 707/10, 102; 370/230, 389, 392, 469, 395.4, 395.5, 39
See application file for complete search history.

(56) References Cited

U.S. PATENT DOCUMENTS

| | | | |
|---|---|---|---|
| 4,769,810 A | 9/1988 | Eckberg, Jr. et al. | |
| 4,849,968 A | 7/1989 | Turner | |
| 5,815,516 A | 9/1998 | Aaker et al. | |
| 5,931,961 A | 8/1999 | Ranganathan et al. | |
| 5,937,169 A | 8/1999 | Connery et al. | |
| 6,067,569 A | 5/2000 | Khaki et al. | |
| 6,122,670 A | 9/2000 | Bennett et al. | |
| 6,421,730 B1 * | 7/2002 | Narad et al. | 709/236 |
| 6,529,508 B1 * | 3/2003 | Li et al. | 370/392 |
| 6,674,769 B1 * | 1/2004 | Viswanath | 370/469 |
| 6,721,332 B1 * | 4/2004 | McAlear | 370/466 |
| 6,754,662 B1 * | 6/2004 | Li | 707/101 |
| 6,831,893 B1 * | 12/2004 | Ben Nun et al. | 370/235 |
| 7,046,665 B1 * | 5/2006 | Walrand et al. | 370/392 |
| 7,236,493 B1 * | 6/2007 | McRae | 370/392 |
| 7,304,996 B1 * | 12/2007 | Swenson et al. | 370/394 |
| 7,317,723 B1 * | 1/2008 | Guru | 370/392 |
| 2002/0095512 A1 * | 7/2002 | Rana et al. | 709/232 |
| 2002/0109706 A1 * | 8/2002 | Lincke et al. | 345/700 |

(Continued)

OTHER PUBLICATIONS

International Business Machines Corporation "Quick Memory Allocation for a Received Frame", Research Disclosure Jun. 2000 pp. 1129-1130.

*Primary Examiner*—Nathan Flynn
*Assistant Examiner*—Alina Boutah
(74) *Attorney, Agent, or Firm*—Scully, Scott, Murphy & Presser, P.C.

(57) ABSTRACT

A wire-speed forwarding platform and method for supporting multifield classification of a packet fragmented into a plurality of fragments in the wire-speed forwarding platform, comprising: receiving a fragment of the fragmented packet at the forwarding platform and deriving a key from one or more fields of the received fragment; and performing multifield classification of the received fragment by matching the key to a rule out of a plurality of rules, the rule comprising a plurality of fields including at least one field for specifying whether the received fragment's fragmentation characteristics are to be applied when performing the multifield classification.

14 Claims, 9 Drawing Sheets

U.S. PATENT DOCUMENTS

| | | | |
|---|---|---|---|
| 2003/0103525 A1* | 6/2003 | Wahl | 370/465 |
| 2003/0197719 A1* | 10/2003 | Lincke et al. | 345/710 |
| 2004/0037299 A1* | 2/2004 | Pandya | 370/401 |
| 2004/0095936 A1* | 5/2004 | O'Neill et al. | 370/392 |
| 2007/0168377 A1* | 7/2007 | Zabarsky | 707/102 |

* cited by examiner

SA = SOURCE ADDRESS
DA = DESTINATION ADDRESS
SP = SOURCE PORT
DP = DESTINATION PORT
FRAG = FRAGMENTED FLAG
NO SUBS = NOT SUBSEQUENT FLAG

RULE DATA BASE 800

| | SA | CA | SP | DP | PROTOCOL | FRAG | NO SUBS | ACTION | |
|---|---|---|---|---|---|---|---|---|---|
| RULE 0 | | | | | | | | | 802 |
| RULE 1 | | | | | | | | | 804 |
| RULE 2 | | | | | | | | | 806 |
| RULE 3 | | | | | | | | | 808 |
| RULE 4 | | | | | | | | | 810 |
| RULE 5 | | | | | | | | | 812 |
| ⋮ | | | | | | | | | |
| RULE N-1 | | | | | | | | | 814 |

FIG. 11

|  | Apply action for packets which are: | Fragmented 712 | Not Subsequent 714 |
|---|---|---|---|
| 1102 | Fragmented or non-fragmented | Don't care | Don't care |
| 1104 | Non-fragmented only | FALSE | Don't care |
| 1106 | Non-fragmented or first fragmented | Don't care | TRUE |
| 1108 | First or subsequent fragment | TRUE | Don't care |
| 1110 | Subsequent fragment only | TRUE | FALSE |

CLASSIFICATION SUPPORT SYSTEM AND METHOD FOR FRAGMENTED IP PACKETS

BACKGROUND OF THE INVENTION

1. Technical Field of the Invention

The present invention generally relates to classification of Internet Protocol (i.e., "IP") packets. More particularly, the present invention is directed to a classification support system and method for efficiently classifying fragmented IP packets (i.e., "fragments") to mitigate the expensive maintenance of state information and buffering of the fragments during conventional classification.

2. Description of the Related Art

Today, computer systems are invariably interconnected into vast computer networks. The interconnected computer systems communicate with each other over packet-switched networks by sending messages. Although many protocols have been developed for transmission of the messages, the preeminent protocol is the Internet Protocol (i.e., "IP"), which subdivides the messages into packets for transmission over the packet-switched networks. Hereinafter, FIG. 1 and FIG. 2 respectively depict conventional IP packet and fragmentation of the IP packet into fragments, while FIG. 3 depicts conventional IP packet classification.

FIG. 1 is a prior art depiction of an Internet protocol ("IP") packet 100 that illustrates an IP header 101 and a TCP header 103. IP utilizes packets to communicate over packet-switched networks (e.g., the Internet). The packet 100 represents a piece of a message transmitted over the packet-switched networks. The packet 100 comprises an IP header 101, which includes fields 102 . . . 124 and data 107. The data 107 comprises a TCP header 103, which includes fields 126-148, as well data 105. Among other things, the IP header 101 includes a source address 122 and destination address 124 for routing the packet. Packet switching refers to the foregoing protocols that, among other things, divide a message to be sent into packets for transmission. Each packet is individually transmitted and may follow different routes to the destination address. Once all the packets forming the message arrive at the destination, they are assembled into the original message. It should be noted that IP packets are sent without establishment of communication paths or clearing procedures. Thus, there may be no protection against loss, duplication, misdelivery, and the like.

Further with reference to FIG. 1, the IP header 101 includes a plurality of 32-bit words, each of which is subdivided into fields, the description of which will be made in more detail hereafter. The version field 102, which is four bits, indicates a format of the IP header 101. The IHL field 104 (i.e., internal header length), which is four bits, represents the length of the IP header 101 in 32-bit words. It should be noted that the minimum value for a correct IP header 101 is five 32-bit words. It should further be noted that some of the fields in the IP header 101 may be of varying bit sizes. The type of service field 106, which is eight bits, represents abstract parameters for a quality of service (i.e., "QoS") to guide selection of actual service parameters when transmitting the packet 100 through a particular network over the Internet. The total length field 108, which is 16 bits, represents a total length of the packet 100 in octets (i.e., an octet is 8 bits in length), including both the IP header 101 and data length 107. The identifier field 110, which is 16 bits, represents an identifying value assigned by a sender to aid in assembly of fragments of a packet (i.e., fragment ID). The flags field 112, which is three bits, represents various control flags directed to fragmentation that is described likewise described in greater detail hereinafter. The fragment offset field 114, which is 10 bits, indicates a position of the packet 100 to which a particular fragment belongs. It should be noted that the fragment offset in field 114 is measured in octets, wherein the fragment offset for a first fragment is zero.

Yet further with regard to FIG. 1, the time to live field 116 (i.e., "TTL"), which is 8 bits, indicates a maximum time that the packet 100 is allowed to remain on the Internet. It should be noted that is the value of field 116 is measured in seconds and if it reaches zero, the packet 100 is destroyed. The protocol field 118, which is eight bits, indicates a next level protocol used in the data portion of the packet, such as TCP protocol described herein below. The header checksum field 120, which is 16 bits, represents a checksum only for the IP header 101 of the packet 100. The checksum 120 is a simple error-detection scheme in which the packet 100 is accompanied by a numerical value based on the number of set bits in the IP header 101. It should be noted that since values in various header fields change, the value of field 120 is recomputed and verified at each point where the IP header 101 of packet 100 is processed. The source address field 122 and destination address field 124, which are 32 bits in length, respectively provide the source and destination addresses for the packet 100.

Still further with reference to FIG. 1, the TCP header 101 also includes a plurality of 32-bit words, each of which is subdivided into fields, the description of which will be made in more detail hereafter. The source port field 126, which is 16 bits, indicates a source port. The destination port 128, which is likewise 16 bits, indicates a destination port. In TCP/IP packet-switched networks, the source and destination ports represent endpoint of a logical connection. For example, a port number of 80 is generally used for HTTP (i.e., HyperText Transfer Protocol) traffic. The sequence number field 130 indicates a first data octet in a fragment, except that if SYN is present, the sequence number 220 is ISN+1 (i.e., initial sequence number). The acknowledgement number filed 132, which is 16 bits, is used for error correction and generally contains a value of a next sequence number to be received. The data offset filed 134, which is 4 bits, represents a number of 32-bit words in the TCP header 103. Thus, this number generally indicates where data 105 of packet 100 begins. The reserved field 136, which is 6 bits in length, represents bits reserved for future use and is presently set to zero. The flags field 138, comprises six control bits, including: 1) urgent pointer field significant (i.e., URG); 1) acknowledgement field significant (i.e., ACK); 2) push function (i.e., PSH); 4) reset the connection (i.e., RST); 5) synchronize sequence numbers (i.e., SYN) and 6) no more data from the sender (i.e., FIN). Window field, which is 16 bits, indicates a number of data octets that the sender of this fragment is willing to accept, beginning with the first octet indicated in the acknowledgement number field 130. The TCP checksum field 142, which is 16 bits, is used for error detection. The urgent pointer field 144, which is 16 bits, represents a current value of the urgent pointer as a positive offset from the sequence number field 130 in this fragment. That is, the urgent pointer points to a sequence number of an octet following urgent data and urgent pointer field 146 is interpreted only if the URG control bit is set in field 138. The options field 146 represents available options, may or may not appear in the TCP header and may vary in length. The padding filed 148 appends enough padding to ensure that the TCP header 103 ends on a 32-bit boundary.

FIG. 2 is a prior art high-level depiction 200 of packet fragmentation for packet 100 of FIG. 1. One of the mechanisms of the Internet Protocol ("IP") routing is fragmentation and reassembly of packets. While being transmitted over the Internet via myriad intermediary packet-switched networks, the contents of packet 100 do not change on the way to its destination unless fragmentation occurs. Every physical network of the Internet has its own limitation on the size of data that it may carry, which is indicated by an associated MTU (i.e., maximum transmission unit). Under some circumstances, particularly when a large packet must travel through a network with a smaller MTU, the packet must be divided into a plurality of smaller fragments at appropriate places 202 (i.e., fragments are also packets) within the smaller MTU, such as fragment 201 and fragment 203, so that the fragments may travel through the network onto their journey to the destination. This process of division is called fragmentation. Every fragment 201 and 203 includes an IP header HD-I 204 and HD-II 210, and each of which respectively carries data 208 and 212 that is part of data 105 of the original packet 100. It should be noted that during fragmentation, only a sequentially first fragment 201 includes a TCP header 206, which is obtained from the TCP header 103 of packet 100.

A conventional IP packet classifier utilizes the data in the IP header 101 and TCP header 103 to classify the arriving IP packets including IP fragments, i.e., TCP classification. The conventional packet classifier classifies the arriving IP packets (and fragments) into flows based on a set of rules in a rules database maintained by the packet classifier, wherein each flow obeys at least one of the set of rules. The classifier consults the rules database for each arriving packet. In particular, the rules database has a set of pattern and action associations. In the case of TCP rules, the pattern usually includes fields from the IP 101 and TCP 103 headers, as particularly illustrated in FIG. 1 above. The pattern may be either an exact match on a field value or on a range of values in the headers 101 and 103. During classification, a key is extracted from the arriving packet or fragment. Generally, the key is formed by taking fields from the IP 101 and TCP 103 headers (depicted in FIG. 1 above). The classifier will then, using a classification algorithm (not important here), find the best match of the extracted key to a pattern in the rules database. The classifier will then apply the actions found in the rules database corresponding to the matching pattern. The possible actions may include discarding the packet (i.e., destroying it); forwarding the packet (i.e., normal processing); updating the type of service field (i.e., "ToS") 106 depicted in FIG. 1 for the packet; directing the packet to an alternate next router (i.e., overriding the next router as determined by a conventional IP routing algorithm); directing the packet to a MultiProtocol Label Switching (i.e., "MPLS") network; redirecting the packet to another processor for more advanced packet processing, and policing a rate of packets of a particular flow (i.e., if the rate is exceeded, discarding the packets).

In the case of IP fragments, the key cannot be extracted directly from the fragments, since only a sequentially first fragment includes all of the necessary information, i.e., a TCP header 103 of FIG. 1. As a consequence, for such packets, the classification must be enhanced. More particularly, since the information in the TCP header 103, such as source port 126 and destination port 128, is included in the sequentially first fragment 201 and it is often part of classification rules for IP fragments in the conventional classifier, state information must necessarily be maintained for the fragmented packet during the time that the IP fragments for the fragmented packet are processed via the classifier. Furthermore, buffering of the IP fragments may be required since the IP fragments may arrive out of sequence, i.e., sequentially first IP fragment may not arrive first. Consequently, the storage of state information and the buffering of IP fragments are computationally expensive. Furthermore, the classification of the IP fragments via the conventional classifier described with reference to FIG. 3 below cannot be performed on a "wire speed" forwarding platforms, such as International Business Machines (i.e., "IBM") Network Processor (i.e., high-speed hardware-based forwarding platform depicted in FIG. 9) and must necessarily be redirected to slow path forwarding platforms, such as Control Point (i.e., depicted in FIG. 10). Consequently, the conventional classifiers are not practical for high-speed hardware-based forwarding platforms, where speed is essential.

FIG. 3 depicts a method flowchart 300 for a conventional IP packet classifier. Before, the prior art classification is described, it is should be noted that there exists a fragment database, which associates a particular pattern to a list of fragments to which actions must be applied. More particularly, the pattern for the fragment database includes the source address 122 and a fragment ID 110 from IP header 101 depicted in FIG. 1 above. Conventional classification starts at step 302. At step 304, the classifier receives an IP packet. At step 306, the classifier determines whether the received IP packet is a fragment of a fragmented IP packet. Referring to FIG. 1, determination of whether the received packet is fragmented may be accomplished by a two-field test, i.e., testing a more fragments flag that is part of flags field 112 in FIG. 1 and testing the fragment offset field 114 of FIG. 1. The more fragments flag being equal to zero indicates that there has been no fragmentation, whereas the more fragments flag not being equal to zero indicates that the received IP packet is a fragment in most instances. Since a sequentially last fragment of a fragmented packet will have the more fragments flag equal to zero, the second test must also be performed. If the fragment offset 114 is not equal to zero, then the packet is a fragment, i.e., a sequentially last fragment. Now referring back to FIG. 3, if the received packet is not fragmented, normal IP packet classification is performed at step 308, as particularly described above with reference to classification of IP packets above. However, if the received packet is a fragment as determined at step 306, and then the source address 122 and fragment ID 110 are extracted from the IP header 101 of the fragment, which is illustratively depicted in FIG. 1. At step 312, it is determined whether the fragment is a sequentially first fragment of the fragment IP packet. Again referring to FIG. 1, the fragment offset field 114 of IP header 101 indicates a position of the fragment in the fragmented IP packet. Consequently, if the fragment offset field 114 contains a value of zero, this represents that the fragment is a sequentially first fragment. If it is determined at step 312 that the fragment is not a sequentially first fragment, processing continues to step 314 where using the extracted source address 122 and fragment ID 110 as part of a key, the classifier performs a look up at step 316 to obtain an action to be performed on the fragment. If the key is not found, then no actions were yet ascribed to the fragmented IP packet of which the fragment is part, and the fragment is buffered with its key (source address and fragment ID) at step 318. However, if step 316 the key if found for the fragment, an action pursuant to this key is applied at step 320 to the fragment and the method exits at step 332. It is noted, that in instances where although the key is found at step 316 no actions are ascribed, the packet is buffered together with a list of buffered fragments according to a particular pattern associated with the fragment. Thereafter, the method exists at step 322.

Now returning back to step 312, if it determined that the fragment is a sequentially first fragment of the fragmented IP packet, then at step 322 TCP classification is performed as described above. That is, a key is extracted from the received sequentially first fragment and matched to a pattern in the rules database, thereby obtaining actions associated with the matched pattern. At step 324, the actions are stored in the fragmentation database using the source address 122 and fragment ID 110 of the sequentially first fragment as a key so that the actions may later be applied to other fragments. More particularly, the actions are copied from the rules database to the fragmentation database. At step 326, a lookup for all fragments that were buffered at step 318 is performed utilizing the key (source address and fragment ID). At step 328, a determination is made regarding whether there is another buffered fragment for the fragmented IP packet by utilizing the key. At step 330, an action associated with the key is applied to the buffered fragment and the fragment is released. Once all buffered fragment have been processed, at step 320 the sequentially first fragment is processed utilizing the actions associated with the key and the method exits at step 332. It should be noted, however, that the sequentially first fragment may be processed before all buffered fragments depending upon implementation. That is, normally a router does not re-order received fragments into their sequential order because it may be too expensive, but reordering may save processing time in subsequent routers.

The conventional classification of fragmented packets described above is not practical for implementation in a system, which utilizes high-speed forwarding devices, such as network processors (i.e., "NPs"). The NPs often have a limited number of instructions that can be executed per packet in order to maintain "wire-speed" forwarding rates for the received fragments. The above-identified algorithm, when implemented as a program, is likely to exceed a maximum number of instructions allowed for wire speed forwarding in an NP. Furthermore, the required buffering of fragments, maintenance of state information and lists of packets in the fragment database may be beyond the capability of the NP. As a consequence, the fragments may be forwarded for processing to a general-purpose processor. Since the general-purpose processor is orders of magnitude slower than the NP, wire speed forwarding of fragmented packets (i.e., fragments) cannot be achieved.

In view of the above described prior art classification there is a need in the art to provide a classification support system and method to robustly and efficiently classify IP fragments, mitigating the expensive maintenance of state information and buffering of IP fragments necessitated during conventional classification, thereby allowing the classification to be performed on the wire-speed network processors.

SUMMARY OF THE INVENTION

The present invention generally relates to routing, and more particularly to a method and system for efficiently classifying Internet Protocol ("IP") fragments that mitigates maintenance of state information and buffering of IP fragments during conventional classification.

It is therefore an object of the present invention to provide a method and system for efficiently classifying IP fragments, which mitigate expensive maintenance of state information and buffering of IP fragments during conventional classification.

It is another object of the present invention to provide a method and system that reduce a likelihood that IP fragments may have to be forwarded to a slower general-purpose processor (i.e., GPP), such as a Control Point (i.e., "CP").

It is yet another object of the present invention to provide a method and system that facilitate wire speed processing of IP fragments via a wire-speed forwarding platform, such as a Network Processor (i.e., "NP").

It is a further object of the present invention to provide a method and system that facilitate an operator to input rules for specifying how IP fragments should be classified in the NP.

It is yet a further object of the present invention to provide a method and system that facilitate prior-art classification in the GPP if IP fragments require such processing based on the rules specified by the operator.

Thus according to an embodiment of the present invention, there is provided a method for supporting multifield classification of a packet fragmented into a plurality of fragments in a wire-speed forwarding platform, the method comprising: receiving a fragment of the fragmented packet at the forwarding platform and deriving a key from one or more fields of the received fragment; and performing multifield classification of the received fragment by matching the key to a rule out of a plurality of rules, the rule comprising a plurality of fields including at least one field for specifying whether the received fragment's fragmentation characteristics are to be applied when performing the multifield classification.

According to another embodiment of the present invention there is provided a method for supporting multifield classification of a packet fragmented into a plurality of fragments in a wire-speed forwarding platform, the method comprising: receiving a fragment of the fragmented packet at the forwarding platform and deriving a key from one or more fields of the received fragment; preprocessing the received fragment by querying a data structure that comprises one or more flags for determining whether the received fragment is to be classified in the forwarding platform; redirecting or discarding the received fragment from the forwarding platform if it is determined that the received fragment is not to be classified at the forwarding platform; and performing multifield classification of the received fragment by matching the key to a rule out of a plurality of rules, the rule comprising a plurality of fields including at least one field for specifying whether the received fragment's fragmentation characteristics are to be applied when performing the multifield classification.

According to a further embodiment of the present invention there is provided a program storage device readable by a machine, tangibly embodying a program of instructions executable by the machine to perform the method steps for supporting multifield classification of a packet fragmented into a plurality of fragments in a wire-speed forwarding platform, the method comprising: receiving a fragment of the fragmented packet at the forwarding platform and deriving a key from one or more fields of the received fragment; and performing multifield classification of the received fragment by matching the key to a rule out of a plurality of rules, the rule comprising a plurality of fields including at least one field for specifying whether the received fragment's fragmentation characteristics are to be applied when performing the multifield classification.

According to yet a further embodiment of the present invention there is provided a wire-speed forwarding platform for supporting multifield classification of a packet fragmented into a plurality of fragments, the platform comprising: media interface for receiving a fragment of the fragmented packet at the forwarding platform; a network processor for deriving a key from one or more fields of the received fragment; and performing multifield classification of the received fragment by matching the key to a rule out of a plurality of rules, the rule comprising a plurality of fields including at least one field for specifying whether the received fragment's fragmentation characteristics are to be applied when performing the multifield classification.

According still to another embodiment, there is provided a method for supporting multifield classification of a packet fragmented into a plurality of fragments in a wire-speed forwarding platform, the method comprising: receiving a fragment of the fragmented packet at the forwarding platform and deriving a key from one or more fields of the received fragment; determining whether there are transfer control protocol (TCP) rules and if it is determined that there are no TCP rules indicated performing multifield classification of the received fragment according to the last step; preprocessing the received fragment if there are TCP rules by querying a data structure that comprises one or more flags for determining whether the received fragment is to be classified in the forwarding platform, and redirecting or discarding the received fragment from the forwarding platform if it is determined that the received fragment is not to be classified at the forwarding platform; and performing multifield classification of the received fragment by matching the key to a rule out of a plurality of rules, the rule comprising a plurality of fields including at least one field for specifying whether the received fragment's fragmentation characteristics are to be applied when performing the multifield classification.

BRIEF DESCRIPTION OF THE DRAWINGS

The objects, features and advantages of the present invention will become apparent to one skilled in the art, in view of the following detailed description taken in combination with the attached drawings, in which:

FIG. 11 is an exemplary table for illustrating different combinations of the fragmented flag and the not subsequent flag for providing special treatment to IP fragments according to the present invention.

DETAILED DESCRIPTION OF THE PREFERRED EMBODIMENT OF THE INVENTION

Figure 4:
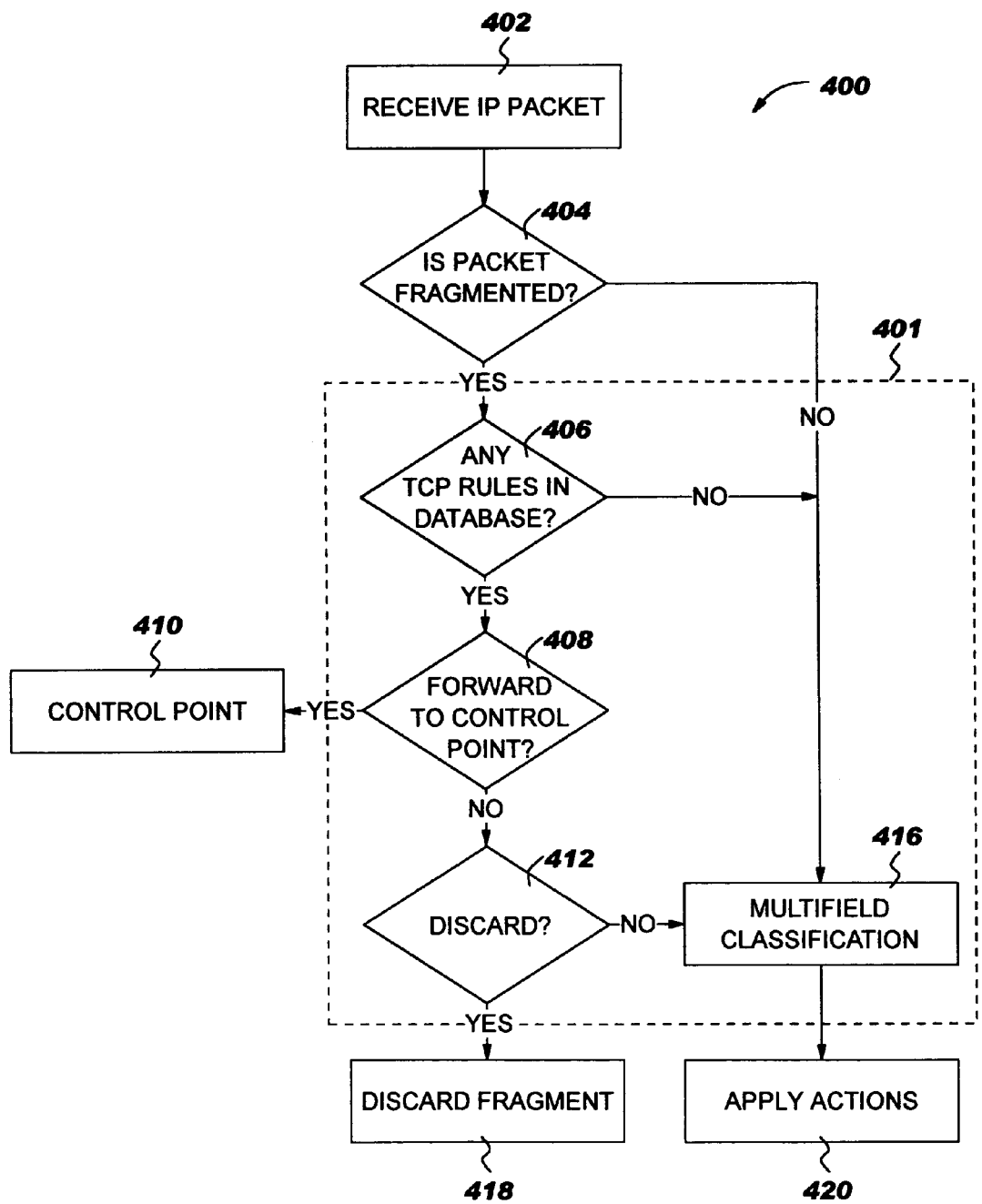
FIG. 4 is an exemplary classification support method for supporting the classification of IP fragments according to the present invention.

The present invention is directed to a classification support method and system for efficiently classifying Internet Protocol ("IP") fragments to mitigate the expensive maintenance of state information and buffering of IP fragments necessitated by conventional classification systems. The classification support method for classifying IP fragments, which is depicted in FIG. 4, is implemented on a wire-speed Network Processor (i.e., "NP") of FIG. 9. Alternatively, the IP fragments that are not classified in the NP are either forwarded (or redirected) to a slower-speed Control Point (i.e., "CP") of FIG. 10 or discarded.

Figure 1:
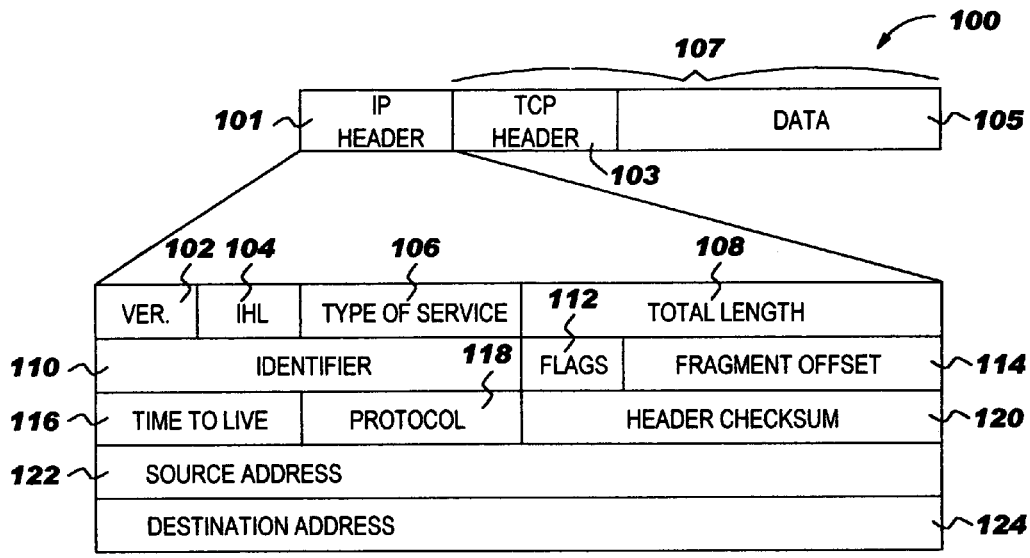
FIG. 1 is a prior art depiction of an Internet Protocol ("IP") packet.
Figure 1:
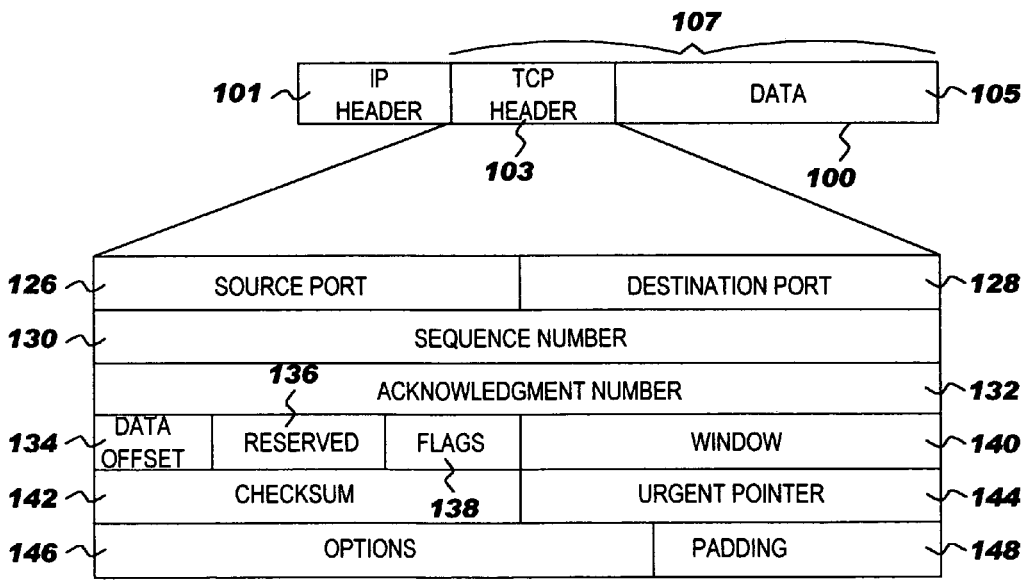
Figure 2:
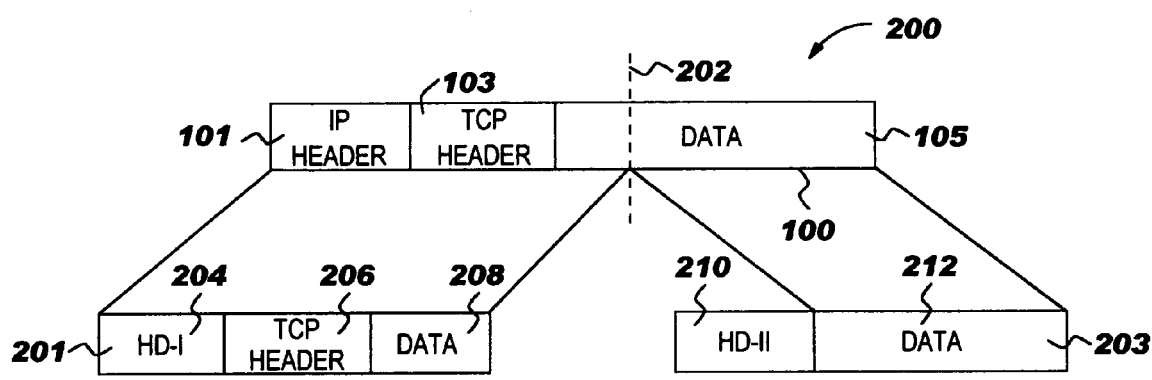
FIG. 2 is a prior art depiction of fragmentation of the IP packet of FIG. 1.

FIG. 4 is an exemplary classification support method for supporting the classification of IP fragments according to the present invention. In FIG. 4, while reference 401 represents the classification support method according to the present invention, all extraneous references provide a context for the present invention. At step 402, a packet to be classified is received from a media interface (e.g., media interfaces 920 and 922 depicted in FIG. 9). It is noted that the flow in FIG. 4 occurs once for every received packet. After receipt, the packet is tested at step 404 for fragmentation by performing the two-field test of the more fragments flag of field 112 and the fragment offset field 114 of FIG. 1, as particularly described above. If it is determined that the packet is not fragmented, the classification support method continues to the multifield classification at step 416, which classifies the received packet according to a key (i.e., reference number 500 depicted in FIG. 5) derived from received packet and matched to rules (i.e., reference number 701 depicted in FIG. 7) in a rules database (i.e., reference number 800 depicted in FIG. 8). However, if it is determined that the packet is fragmented, i.e., representing a fragment of a fragment IP packet, at step 406 the classification support method determines whether there are any TCP rules in the rules database according to a TCP rules flag (i.e., reference number 602 depicted in FIG. 6) in a global data structure (i.e., reference number 600 depicted in FIG. 6), which is described below with reference to FIG. 6. If there are no TCP rules, the method continues at step 416 to the multifield classification as mentioned above. However, if there are TCP rules, the classification support method continues at step 408, where it further determines whether to forward the fragment to the slower-speed Control Point (i.e., "CP") 410 according another flag, forward to control point if fragmented flag (i.e., reference number 606 depicted in FIG. 6) that is also part of the global data structure (i.e., reference number 600 depicted in FIG. 6). It is noted that the CP is depicted in exemplary FIG. 10 described in detail below. Thus, if it is determined that the fragment is not to be forwarded to the CP, the classification support method yet further determines whether to discard the fragment at step 412 according to yet another flag, discard if fragmented flag (i.e., reference number 604 depicted in FIG. 6) that is also part of the global data structure (i.e., reference 600 depicted in FIG. 6). Thereafter, at step 418, the fragment is discarded. It should be noted here and will be described in detail in FIG. 6 that the flags 604 and 606 depicted in FIG. 6 are mutually exclusive. That is, the received fragment is either forwarded to the CP 410 or discarded at 418. However, if the fragment is not discarded at step 412, at step 416 the fragment is classified according to multifield classification described above, i.e., the fragment via its derived key is classified according to (or matched against) the TCP rules in the rules database illustratively depicted in FIGS. 7 and 8 and associated actions are applied at step 420 according to the matched rules.

Figure 5:
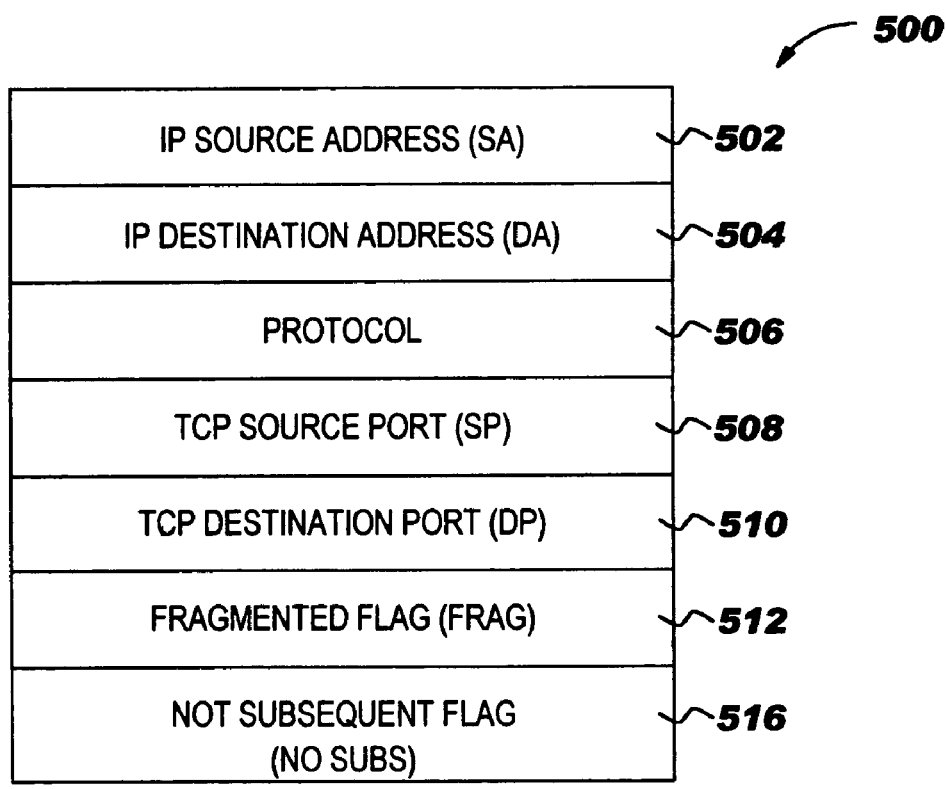
FIG. 5 are exemplary fields that form a key utilized by the classification support method of FIG. 4 to classify received packets according to the present invention.
Figure 6:
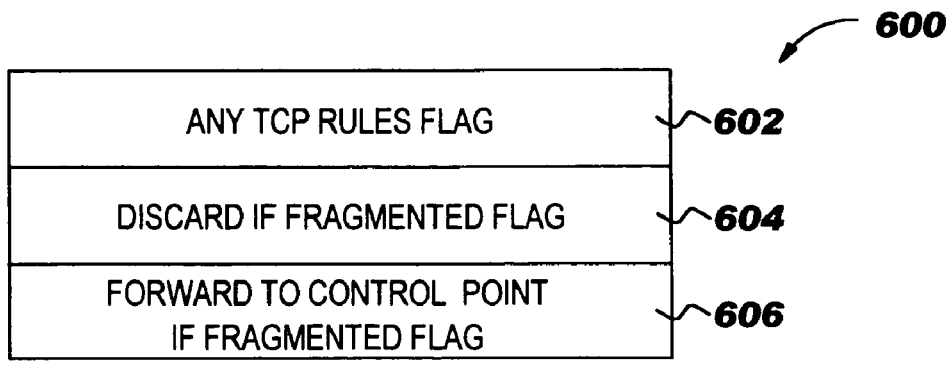
FIG. 6 is an exemplary global data structure comprising flags that are utilized by the classification support method of FIG. 4 according to the present invention.

FIG. 5 depicts exemplary fields 502-516 that form a "key" 500 utilized by the classification support method of FIG. 4 to classify a received packet, including a fragment, according to the present invention. The source address field (i.e. "SA") 502 of the key is obtained from the source address field 122 in the IP header 101 of FIG. 1 of the received packet, while destination address field (i.e. "DA") 504 of the key 500 is obtained from the destination address field 124 in the IP header 101 of FIG. 1 of the received packet. The protocol field 506 of the key 500 is obtained from the protocol field 118 in the IP header 101 of FIG. 1 of the received packet. The source port field (i.e. "SP") 502 of the key 500 is obtained from the source port field 126 in the TCP header 103 of FIG. 1 of the received packet, while destination port field (i.e. "DA") 510 of the key 500 is obtained from the destination port field 128 in the TCP header 103 of FIG. 1 of the received packet. It should be noted that the TCP header is only present in a sequentially first fragment of the fragment IP packet. The fragmented flag field (i.e., "FRAG") 512 and the not subsequent flag field (i.e., "NO SUBS") 516 of the key 500 are derived from the received packet according to the two-field test of the more fragments flag of field 112 and the fragment offset field 114 of FIG. 1. More particularly, values for the fragmented flag field 512 and the not subsequent flag field 516 of the key 500 are derived in accordance with the following logic: if both fields 112 and 114 of the received packet are equal zero, then fields 512 and 516 of the key 500 are respectively set to zero and one; if field 112 is one and field 114 is zero of the received packet, then both fields 512 and 516 of the key 500 are set to one; for all other combinations of fields 112 and 114 of the received packet, fields 512 and 516 of the key 500 are respectively set to one and zero. It is noted that both fields 512 and 516 are never set to zero because if the received packet is not fragmented then necessarily it cannot be a subsequent fragment.

Figures 7, 8:
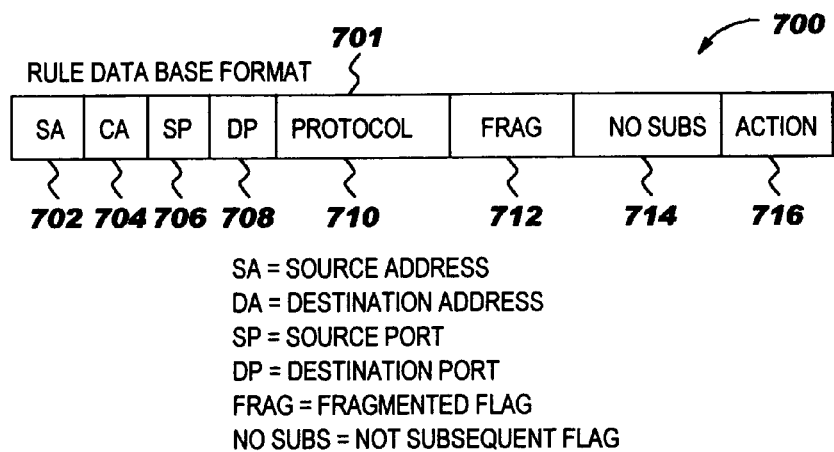
FIG. 7 is an exemplary rule database format for a rule in a rules database of FIG. 8 below according to the present invention.
FIG. 8 is an exemplary rules database comprising one or more rules that is stored in memory of the network processor of FIG. 9 below, according to the present invention.

FIG. 6 depicts an exemplary global data structure 600 comprising 3 flags 602-606, which are utilized by the classification support method of FIG. 4 according to the present invention. As aforementioned with reference to FIG. 4, flags 604 and 606 are mutually exclusive. Therefore, these flags have alternate values, such as flag 604 being set and flag 606 not being set, and vice versa. Alternatively, these flags 604 and 606 may be combined into a single new flag that is two bits, where the contents of the flag determine whether to forward the fragment to the CP 410, discard the fragment 418, or perform multifield classification 416. For example, two zero values in the two bits of the new flag is for forwarding the fragment to the CP 410, a zero and a one in the two bits respectively is for discarding the fragment 418, a one and a zero in the two bits respectively is for performing multifield classification 416, and two ones is an invalid combination not considered by the classification support method. The flags 602-606 are set in accordance with the following logic. The "any TCP rules" Flag 602 is initially set to false, representing that there are no multifield classification rules (i.e., reference number 701 depicted in FIG. 7) present in the rules database (i.e., reference number 800 depicted in FIG. 8). When an operator adds a TCP rule to the rules database for performing multifield classification, the flag 602 is set to true. But, if a non-TCP rule is added the flag 602 remains unchanged. Subsequently, when the operator removes the last rule 701 from the rules database, the flag 602 is set to false. Setting the flag 602 represents indirect configuration based on a type of rule (i.e. TCP rules). It should be noted, if other types of rules are used (e.g., UDP, ICMP, IGMP and the like), the global data structure may be extended to provide additional flags for such rule types, although it should be understood that the foregoing protocols do not support fragmentation. As described above, the "discard if fragmented" flag 604 and the "forward to control point if fragmented" flag 606 are explicitly set by the operator, while the "any TCP rules" flag 602 is implicitly set by the operator by adding a rule (FIG. 7) to the rules database (FIG. 8). In operation, the global data structure 600 is interrogated at run time, as particularly illustrated in FIG. 4.

FIG. 7 is an exemplary rule database format 700 for a rule 701 in a rules database 800 of FIG. 8 below according to the present invention. A format 700 for each rule in the rules database 800 is shown. Each of the fields 702-710 of rule 701 may include an upper and lower limit, which may be the same, which corresponds to a field of the key 500 depicted in FIG. 5 above. Each of the upper and lower limits of source address field 702 is organized into four bytes of eight bits each with a dot representing separation, and each of the upper and lower limits of the destination address 704 is organized into four bytes of eight bits each with a dot representing separation. For example, when the lower limit is a zero and the upper limit is a maximum value for either the source address or the destination address field of rule 701, any values in a corresponding source or destination address field of the key 500 will match the rule for that field. The source port 706 is 16 bits and the destination port 708 is likewise 16 bits. The protocol 710 is 8 bits and the action 716 is 23 bytes of which 8 bits represent a type of action. The following is an alternative but equivalent formulation for the fields 702-710. The source address 702 may be four integers with values in the interval 0 . . . 255 including a dot designating separation (e.g., 17.3.1.18) or one integer with a value in the interval 0 . . . 4, 294, 967, 295, such as for example 285,409,554. The destination address 704 may likewise be four integers with values in the interval 0 . . . 255 including a dot designating separation or one integer with value in the interval . . . 4,294,967,295. The source port 706 may be an integer with value in the interval 0 . . . 65,535, while destination port 708 may be an integer with a value in the interval 0 . . . 65,535. The protocol 710 may be an integer with a value in the interval 0 . . . 255 and each byte in the action 716, which as mentioned above is multi-byte, may be an integer with value in the interval 0 . . . 255. It is noted that although the foregoing intervals are presented for completeness, the present invention is not limited to the recited intervals and instead contemplates other intervals of the current or future state of the art. The fragmented flag field 712 and the not subsequent flag field 714 may be two bits each for specifying respectively that a packet is fragmented, and that the packet is either not fragmented or is not a sequentially first fragment. More particularly, the two bits for each flag field 712 and 714 may comprise a mask and a value, in which: if mask is a zero, then the value is irrelevant (don't care); if mask is a one, then the value must match the corresponding field 512 or 516 of key 500 (true or false) derived from the received packet, as particularly described in FIG. 11 below. In an alternate but equivalent formulation, the flag fields 712 an 714 may each be implemented as integers with values 0 (false), 1 (true) and −1 (don't care). More particularly, different combinations of values for the bits 712 and 714 may be used to provide special treatment for fragments, as particularly described with reference to FIG. 11. Notwithstanding the fact that format 700 of the exemplary rule 701 includes TCP rules that comprise fields including the IP and the TCP headers, the rule 701 may nonetheless be extended to include protocols other than TCP, such as, User Datagram Protocol (i.e., "UDP") for directly broadcasting messages over an IP network, Internet Control Message Protocol (i.e., "ICMP") for transmitting error, control, and informational messages, the Internet Group Management Protocol (i.e., "IGMP") for IP multicasting on the Internet, and the like. FIG. 8 is an exemplary rules database 800 comprising one or more rules, i.e., a set of rules 0 (i.e., reference number 802) through N−1 (i.e., reference 814), which is stored in memory of the network processor of FIG. 9, according to the present invention. The rules database 800 therefore gives rise to a matrix with N rows and eight columns. It should be noted that the rules 802-814 in the rules database 800 are entered by an operator via a terminal or any other input means known in the art. In general, there are instance in which more that one rule 802-814 may inadvertently and erroneously match a fragment's key 500. Although the reasons for legitimately matching a key 500 derived from the incoming fragment to one or more rules in the rules database 800 and algorithms used to decide which of the matching rules to use is beyond the scope of the present invention, the following description provides for using the two flag fields 712 and 714 for avoiding the erroneous rule matches. For example, suppose there is a rule 701 with the source port (i.e., "SP") 706 equal to 81. Further, assume that there are TCP rules in the rules database 800 have "don't care" values for the fields 712 and 714 (described in detail in FIG. 7 above). Then, during classification, the classification support method of FIG. 4 will attempt to match rules 701 with both fragmented and non-fragmented packets for a received fragment. If the classification support method attempts to compare the rule with the SP 706 equal to 81 against a subsequent fragment, for which there is no SP field 706, then the classification support method may erroneously declare a match. That is, this may happen because the subsequent fragment will likely include valid data in the same position as the TCP source port 508 that is part of a sequentially first fragment. This valid data of the subsequent fragment, which is not the TCP source port 508, may include a value of 81. Consequently, in the above situation, the fields 712 and 714 in the one or more rules of database 800 may specify fragmentation characteristics of packets to which the rule should not be applied. More particularly, the operator may input rules, which are designated to apply or not to apply to packets depending on their fragmentation characteristics, thereby providing an advantage of avoiding erroneous rule matches. There are many known algorithms, such as a choice-bit algorithm, for matching the key 500 against the rules in the rule database 800, which may all benefit from the present invention.

Figure 9:
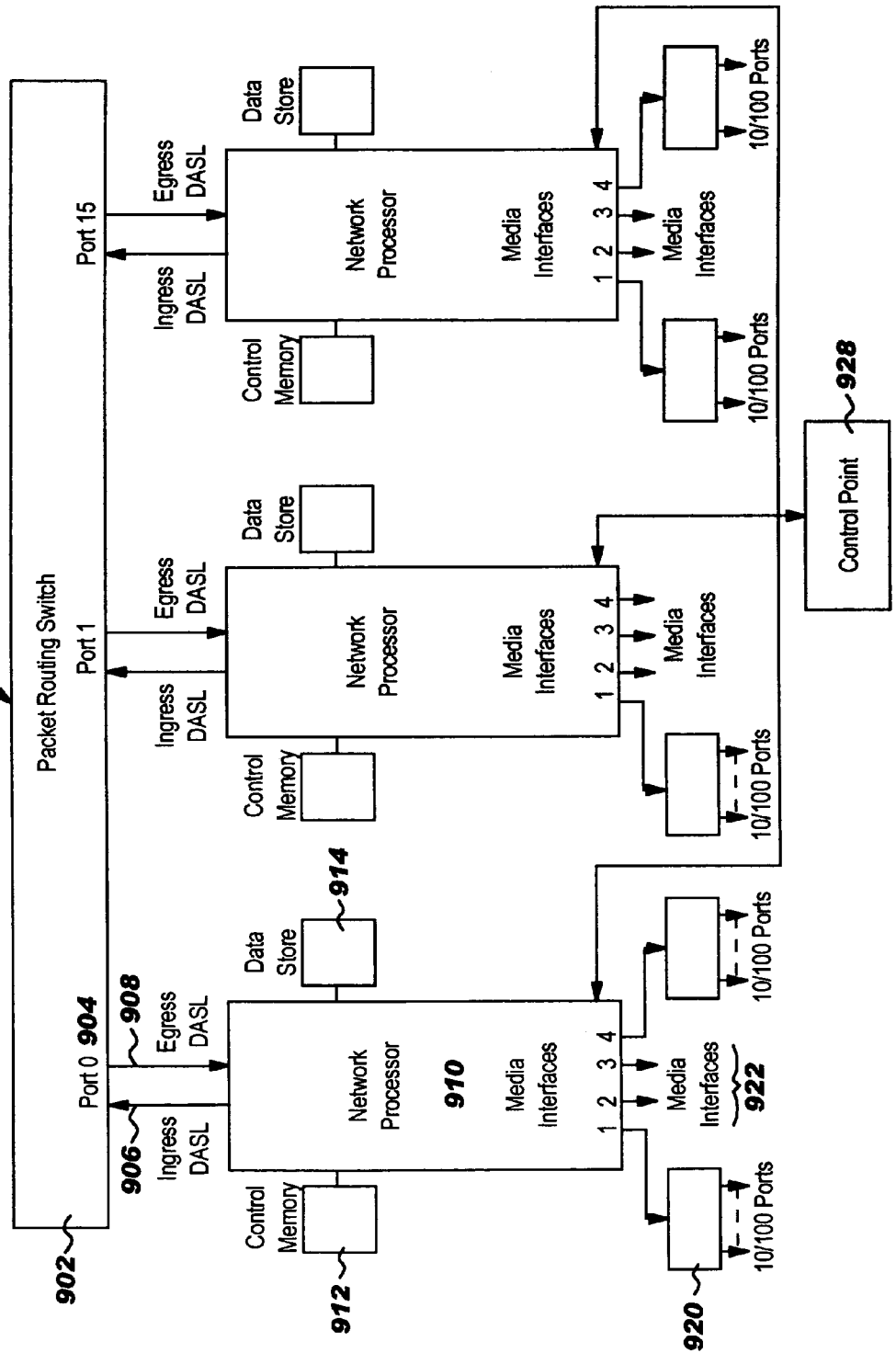
FIG. 9 is an exemplary block diagram of a wire-speed network processor subsystem according to the present invention.

FIG. 9 is an exemplary block diagram of a wire-speed network processor subsystem 900 according to the present invention. A packet routing switch 902 is coupled to one or more network processors (i.e., "NP") 910. For clarity and brevity one network processor (i.e., "NP") will hereafter be described, although it is understood that the description applies equally to the one or more NPs 910 according to the present invention. The NP 910 provides media interfaces for connecting to network having various protocols, such as 10 base-T or 100 base-T Ethernet interfaces 920, or other media interfaces 922 known in the art. The NP 910 may route packets, including fragments of fragmented packets, received at any of the media interfaces 920 and 922 to port 0 (i.e., reference number 904) on the packet routing switch 902 via an ingress interface, data aligned serial link (i.e., "DASL") 906. The NP 910 may perform address translation, respond to quality of service (i.e., QoS) requests, block packets and perform complex classification of the received packets, including fragments, according to the present invention. Furthermore, the NP 910 via the egress interface, data aligned serial link (i.e., "DASL") 908, may receive packets including fragments from port 0 (reference number 904) on the packet routing switch 902 and may perform the foregoing complex classification of the received packets, including the fragments, to route the received packets to the media interfaces 920 and 922 as well as the slower-speed Control Point 928, according to the present invention. The data store 914 is used to provide buffering for received packets while they are processed at the NP 910, according to the classification support method described above with reference to FIG. 4. Coupled to the NP 910 is control memory 912 for storing control software (i.e., picocode) that drives the NP 910, as well as the global data structure 600 and the rules database 800. The control point (i.e., "CP") 928 provides for slower-speed conventional classification of received packets according to FIG. 4.

Figure 3:
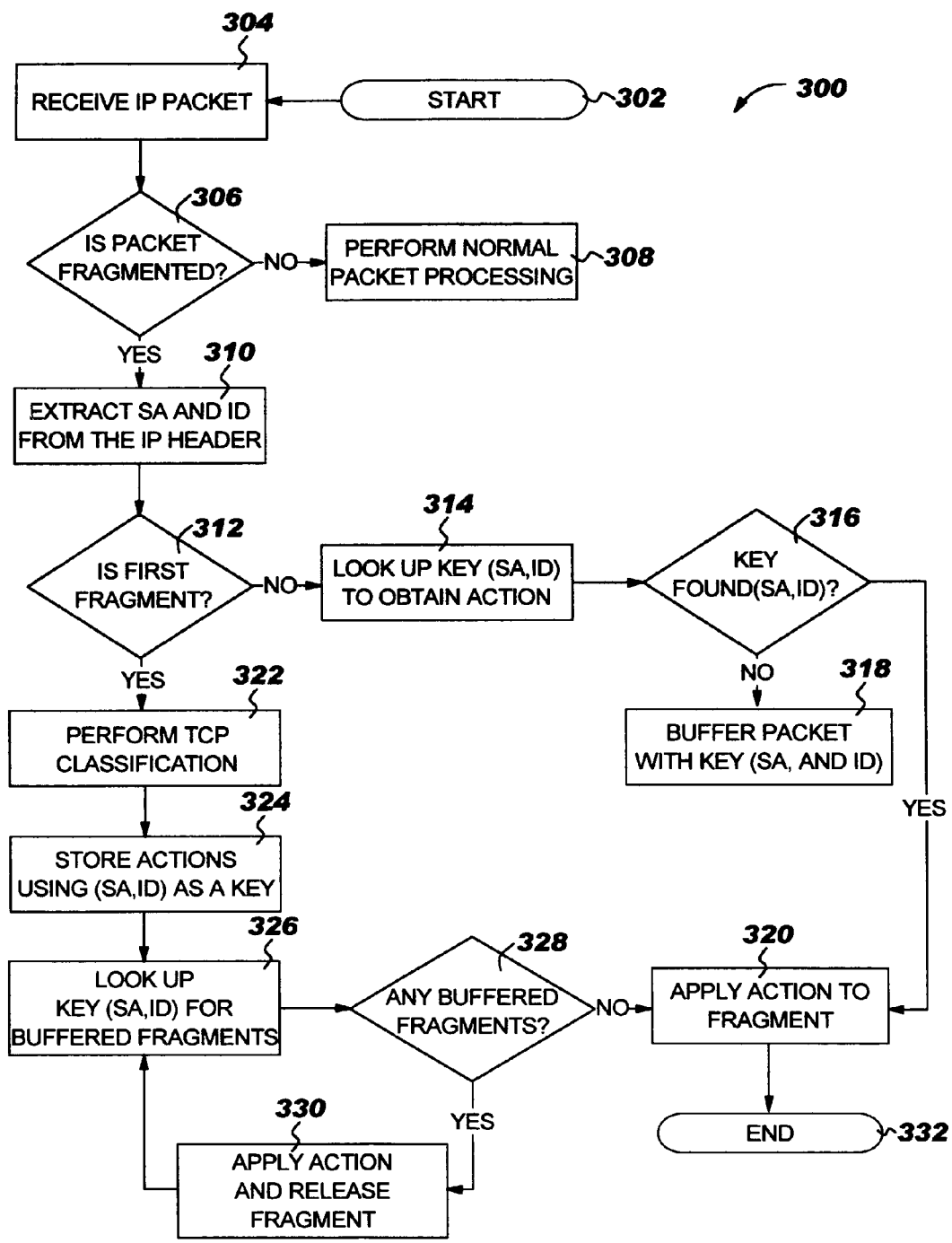
FIG. 3 is a prior art method flowchart for depicting conventional IP fragment classification.

Referring further to FIG. 9, the CP 928 performs the conventional classification of FIG. 3, receiving forwarded packets from the inventive classification support method of FIG. 4. The following summarizes actions of the CP. In operation, the CP 928 buffers subsequent fragments until the sequentially first fragment for a given fragmented packet has been received. It is noted, that there is no guarantee that the sequentially first fragment of a fragmented packet will arrive first. Once the sequentially first fragment has been received at the CP 928, a rule lookup of rules similar to those in rules database 800 of FIG. 8, which are possibly stored in the CP 928, is performed to find matching rules according to a known search algorithm. It is however, very important to note that whatever algorithm is used, the rule lookup will be much slower in the CP 928 than rules search performed on the NP 910. Once matching rules for the sequentially first fragment have been located, actions from the matching rules are applied to the sequentially first fragment and to all subsequently received fragments for the fragmented packet, which may have already been buffered. Information from the sequentially first fragment header 101 (i.e., source address 122 and fragment ID 110), which uniquely identifies the fragmented packet, is used at the key to store corresponding actions in a data structure (not shown). Any fragments subsequently received at the CP 928 interrogate the data structure to determine whether the sequentially first fragment for the fragmented packet has been received at the CP 928. If the CP 928 has received the sequentially first fragment, the stored actions are applied to the fragment. If not, the fragment is buffered at the CP 928 as described above. Fragments buffered in the data structure (not shown) are deleted when the sequentially last fragment of the fragmented packet is received at the CP 928. It is noted that a garbage collection routine may be periodically implemented to delete buffered fragments of a fragmented packet where the CP 928 has not received a sequentially last fragment, e.g., due to loss of the sequentially last fragment, for the fragmented packet.

Figure 10:
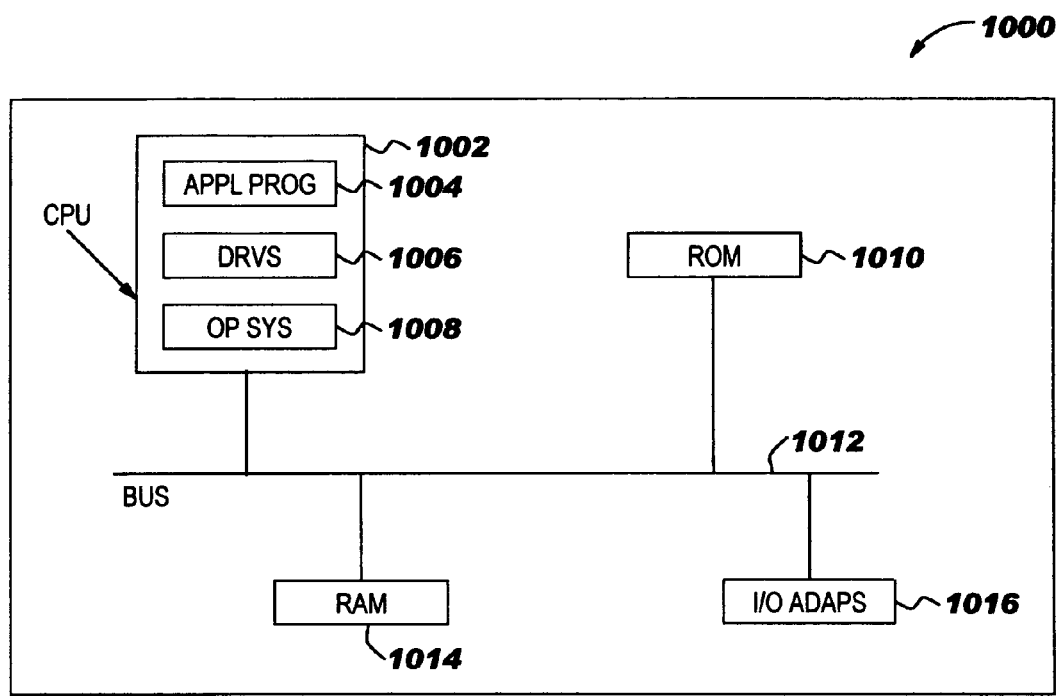
FIG. 10 is an exemplary block diagram of a slower-speed control point according to the present invention.

FIG. 10 is an exemplary block diagram 1000 of a slower-speed control processor (i.e., "CP") 928 according to the present invention. The slower-speed CP 928 is a general-purpose computer comprising a bus 1012 to which central processing unit (i.e., CPU) 1002, read only memory (i.e., "ROM") 1010, random access memory (i.e., "RAM") 1014 and Input/Output adapters (i.e., "I/O ADAPS") 1016 are coupled. The I/O adapters 1016 comprise different types of I/O adapters for supporting different type of I/O devices, such as a keyboard, which may be used by an operator or network administrator for input. Other types of I/O devices such as a mouse, scanner, and the like may be connected to the I/O adapters 1016. The CPU 1022 comprises and operating system (i.e., "OS"), drivers (i.e., "DRVS"), and one or more application programs (i.e., "APPL PROG"). According to the present invention, the CP 928 and the NP 910 communicate via messages. The NP 910 forwards or redirects packets to the CP 928 for conventional classification by appending a header, which gives a context of the redirection. Although the particular type of communication between CP 928 and NP 910 is not important here, it is important that classification that can be quickly performed on the NP 910 should be done there and the classification that may be too time consuming, which unnecessarily drains or taxes the NP 910 resources, may be easily farmed out (redirected or forwarded) to the CP 928 via the rules in the rules database 800.

FIG. 11 is an exemplary table 1110 for illustrating different combinations of the fragmented flag 712 and the not subsequent flag 714 of FIG. 7 for providing special treatment to IP fragments, according to the present invention. As aforementioned with reference to FIG. 7, the two fields 712 and 714 represent a part of the rule pattern, which an operator may employ when defining rules, so as to provide special treatment to fragmented packets (i.e., fragments). According to the present invention, functionality is provided for allowing the operator to create rules 701 with patterns 700, which are stored in a rules database 800, taking into account a packet's fragmentation characteristics. The fragmented flag field 712 in the rule pattern 700 specifies if this rule 701 should match fragmented packets 1108 and 1110 (i.e., TRUE values in field 712), non-fragmented packets 1104 (i.e., FALSE value in field 712) or both 1102 and 1106 (i.e., "don't care"). The not subsequent field 714 in the rule pattern 700 specifies if the rule 701 should or should not match subsequent fragments 1110, or should match either 1102, 1104 and 1108 (i.e., "don't care"). That is, TRUE in field 714 means that the rule 701 should match only non-fragmented packets and the first fragment of a fragmented packet, and FALSE in field 714 means the rule 701 should only match subsequent fragments of a fragmented packet. As particularly depicted in FIG. 11, the fields 712 and 714 may be specified by the operator, and in combination used to produce the following special treatment of IP packets received at the NP 910 of FIG. 9: 1) both fragmented and non-fragmented 1102; 2) non-fragmented only 1104; non-fragmented or first fragment (of a fragmented packet) 1106; first or subsequent fragment (fragmented packets only) 1108; and subsequent fragments only 1110. Upon successful match of the rule 701 including fields 712 and 714, corresponding actions of the rule 701 are applied to the particular type of packet.

In sum, there have been described a flexible and configurable (via data structure 600 and rule database format 700) classification support system and method for classifying fragmented IP packets. More particularly, the present invention couples the global data structure 600 comprising global flags 602-606 of FIG. 6 with a rule format 700 comprising additional fields 712 and 714 in FIG. 7 to form the flexible and configurable system that an operator may employ for obtaining desirable classification for fragmented IP packets. That is, the mutually exclusive global flags 604-606 enable the operator to respectively discard IP fragments received at the NP 910, thereby mitigating expensive processing (i.e., maintenance of state information and buffering of fragments), or alternatively to redirect the received IP fragments to the CP 1000, which enables the operator to determine a percentage of the traffic the CP 1000 may handle, thereby mitigating the expensive processing of IP fragments at the CP 1000. The global flag 602 further enables the NP 910 to classify IP fragments with the knowledge that there are no "TCP rules."

That is, the global flag 602 enables expensive processing of IP fragments to be bypassed for rules, which do not have any associated TCP rules. The rules 701 with rule format 700 comprising additional fields 712 and 714 enable the operator to take into account a fragment's fragmentation characteristics during classification. Therefore, the combination global data structure 600 and the rule format 700 enable the operator to mitigate the expensive processing at the CP 1000.

While the invention has been particularly shown and described with reference to a preferred embodiment thereof, it will be understood by those skilled in the art that the foregoing and other changes in form and details may be made therein without departing from the spirit and scope of the invention.

Having thus described our invention, what we claim as new, and desire to secure by Letters Patent is:

1. A method for supporting multifield classification of a packet fragmented into a plurality of fragments in a wire-speed forwarding platform, the method comprising:
   receiving a fragment of the fragmented packet at the forwarding platform and deriving a key from one or more fields of the received fragment;
   preprocessing the received fragment by querying a data structure that comprises one or more flags for determining whether the received fragment is to be classified in the forwarding platform, one queried flag indicating presence of any pre-defined transfer control protocol (TCP) rules to apply;
   performing multifield classification of the received fragment in the forwarding platform if said one queried flag indicates no TCP rules to apply; and,
   redirecting said received fragment to a further processor for processing said fragment or discarding the received fragment from the forwarding platform if it is determined that the received fragment is not to be classified at the forwarding platform; and
   performing multifield classification of the received fragment by matching the key to a rule out of a plurality of rules, the rule comprising a plurality of fields including at least a first field comprising a first fragmented flag (FRAG) for specifying if this rule should match fragmented frames, non-fragmented frames, or both; and a second field comprising a not subsequent fragment flag (NO SUBS) in the rule key specifying whether this rule should match only non-fragmented frames including a first fragment of a fragmented frame, or is to be matched only to subsequent fragments of a fragmented frame, whereby said first and second fields specify whether the received fragment's fragmentation characteristics are to be applied when performing the multifield classification.

2. The method for supporting multifield classification according to claim 1, wherein the rule farther comprises a field for specifying an action to be applied to the received fragment, the method further comprising a step of:
   applying the action to the received fragment when the key matches the rule for the received fragment.

3. The method for supporting multifield classification according to claim 1, further comprising the steps of:
   receiving a packet at the forwarding platform; and
   testing the received packet for determining whether the packet represents a fragment; and
   performing the multifield classification of the received packet by matching a key derived from one or more fields of the received packet to a rule, the rule comprising a plurality of fields including at least one field for specifying whether the received packet's fragmentation characteristics are to be applied when performing the multifield classification.

4. The method for supporting multifield classification according to claim 1, wherein the preprocessing determines to forward the received fragment to a slow-speed forwarding platform.

5. The method for supporting multifield classification according to claim 1, wherein the preprocessing determines to discard The received fragment.

6. The method for supporting multifield classification according to claim 1, wherein the one or more flags are exclusive of one another.

7. The method for supporting multifield classification according to claim 1, wherein the one or more fields that comprise the key derived from the received fragment include fields from headers representing one or more transmission protocols.

8. The method for supporting multifield classification according to claim 7, wherein the one or more transmission protocols include: Internet Protocol (IP); User Datagram Protocol (UDP); Internet Control Message Protocol (ICMP); and Internet Group Management Protocol (IGMP).

9. The method for supporting multifield classification according to claim 7, wherein the one or more fields include: source address (SA), destination address (DA), protocol, fragmented flag (FRAG) and not subsequent flag (NO SUBS) from a header of an IP transmission protocol; and a source port (SP) and a destination port (DP) from a header of a TCP transmission protocol.

10. The method for supporting multifield classification according to claim 1, wherein a field in each rule comprises one or more values to be matched against the one or more fields of the derived key for the received fragment.

11. The method for supporting multifield classification according to claim 10, wherein the one or more values represent an upper and a lower limit for a field in each rule.

12. The method for supporting multifield classification according to claim 1, wherein the one or more values represent a mask and a value.

13. The method for supporting multifield classification according to claim 1, wherein the plurality of rules are stored in the forwarding platform.

14. The method for supporting multifield classification according to claim 1, wherein the plurality of rules are stored in a rules database.

* * * * *